(12) United States Patent
Chen

(10) Patent No.: US 6,744,715 B2
(45) Date of Patent: Jun. 1, 2004

(54) METHOD FOR REDUCING THE FREQUENCY OF BURN

(75) Inventor: Ling-Feng Chen, Hsinchu (TW)

(73) Assignee: Lite-On It Corp. (TW)

( * ) Notice: Subject to any disclaimer, the term of this patent is extended or adjusted under 35 U.S.C. 154(b) by 28 days.

(21) Appl. No.: 10/124,143

(22) Filed: Apr. 17, 2002

(65) Prior Publication Data

US 2003/0067854 A1 Apr. 10, 2003

(30) Foreign Application Priority Data

Oct. 5, 2001 (TW) ........................................ 90124616 A

(51) Int. Cl.$^7$ ................................................ G11B 7/00
(52) U.S. Cl. .................................. 369/47.36; 369/47.42
(58) Field of Search .......................... 369/47.37, 47.42, 369/47.33, 47.36, 47.44

(56) References Cited

U.S. PATENT DOCUMENTS 6,219,321 B1 * 4/2001 Serizawa et al. ......... 369/47.33
6,418,099 B2 * 7/2002 Yamamoto ............... 369/47.33
6,493,298 B1 * 12/2002 Youn ....................... 369/44.33

* cited by examiner

Primary Examiner—Nabil Hindi
(74) Attorney, Agent, or Firm—Raymond Sun

(57) ABSTRACT

A method of minimizing the occurrence of buffer under run includes calculating the transmission speed of data from a host to a disk drive, adjusting the writing speed of the disk drive to a disk based on the transmission speed, and writing the data from the disk drive to the disk at the adjusted writing speed.

11 Claims, 2 Drawing Sheets

METHOD FOR REDUCING THE FREQUENCY OF BURN

BACKGROUND OF THE INVENTION

1. Field of the Invention

The present invention relates to a method for reducing the occurrence frequency of a well-known phenomenon called "buffer under run" (hereinafter referred to as BURN). In particular, the present invention relates to a method which takes advantage of the difference between the data transmitting speed of a host system and the writing speed of a CD drive to optimize the writing speed of the CD drive so as to reduce the occurrence frequency of BURN and to improve the writing quality and efficiency of the disk.

2. Description of the Prior Art

FIG. 1 is a simple schematic illustrating the writing of data from a host system (e.g., a computer) to a disk that is placed inside a CD drive. The data is transmitted from the host system to the CD drive, where the data is temporarily stored in a buffer zone. When there is sufficient data in the buffer zone, the CD drive writes the data onto the disk. As the writing speed of the CD drive is increased, the data transmitting speed of the host system must be increased correspondingly in order to achieve the best writing quality and efficiency. However, not all host systems will operate at data transmitting speeds that can follow the writing speed of the CD drive. Once the host system's data transmitting speed becomes lower than the CD drive's writing speed, the data that is temporarily stored in the buffer zone of the CD drive will be used up (i.e., written to the disk) faster than the host system can transmit data. This is the "buffer under run" phenomenon, which can lead to write failure.

A number of attempts have been made to address the BURN problem. Some of these technologies, such as BURN Proof, Just Link, and Super Link, can continue the writing operation from the CD drive to the disk even when BURN occurs so as to avoid write failure. In general, a CD drive equipped with BURN Proof, Just Link or Super Link is able to continue writing data to the disk when BURN occurs by utilizing the following operation process: when data is transmitted from the host system to the buffer zone of the CD drive, the amount of data in the buffer zone will be increased, but the writing operation is not yet started. When the amount of the received data in the buffer zone reaches a certain critical value, the writing operation will be started, and at this time, the data in the buffer zone will be slowly consumed as the data is written to the disk. If the data in the buffer zone is completely used up (i.e., all the data in the buffer zone has been written to the disk), the writing operation will be stopped. The writing operation will be restarted when the amount of data in the buffer zone has been accumulated to the critical level again.

Unfortunately, a serious problem experienced by such technologies is that the written data on the disk will contain a large number of "link" points which are the points where the writing operation is stopped and re-started. Although the written data can be read, written data with numerous "link" points is still undesirable because these "link" points may lead to gaps (i.e., destroyed data) in the data. Thus, no matter what technology is used, it is difficult to completely avoid deterioration in the writing quality.

The larger the difference between the writing speed and the host system's data transmitting speed, the more frequently BURN will occur. As a result, the disk's writing quality will be negatively impacted, and the time that is actually taken for writing data to a disk will be much longer than the writing time in the case when no BURN occurs.

Therefore, there still remains a need for a method that minimizes the BURN problems described above.

SUMMARY OF THE DISCLOSURE

It is an object of the present invention is to provide a method that reduces the frequency of the occurence of the BURN phenomenon.

In order to accomplish the objects of the present invention, the present invention provides a method of minimizing the occurrence of buffer under run, which includes calculating the transmission speed of data from a host to a disk drive, adjusting the writing speed of the disk drive to a disk based on the transmission speed, and writing the data from the disk drive to the disk at the adjusted writing speed.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

The present invention provides a method for reducing the occurrence frequency of BURN. To do so, the present invention calculates the speed difference between the writing speed of the disk and the data transmitting speed of the host system based on the time length of occurrence of BURN, so as to determine the optimum writing speed of the CD drive needed to avoid the BURN phenomenon. The writing speed of the CD drive is then modified to minimize the occurence of BURN.

In summary, when the amount of data received by a CD drive from the host system reaches a critical or predetermined value, the writing operation is started, and the time at that point as well as the amount of data in the buffer zone at that point are recorded. When BURN occurs, the time when the BURN occurs, as well as the aforementioned recorded data amount and time, are calculated to obtain the difference between the host system's data transmitting speed and the CD drive's writing speed. The CD drive's writing speed is then optimized based on the aforementioned difference.

Although the following description of the present invention is made in connection with a CD drive, the principles of the present invention are equally applicable to all systems where data is written to a disk.

Figure 1:
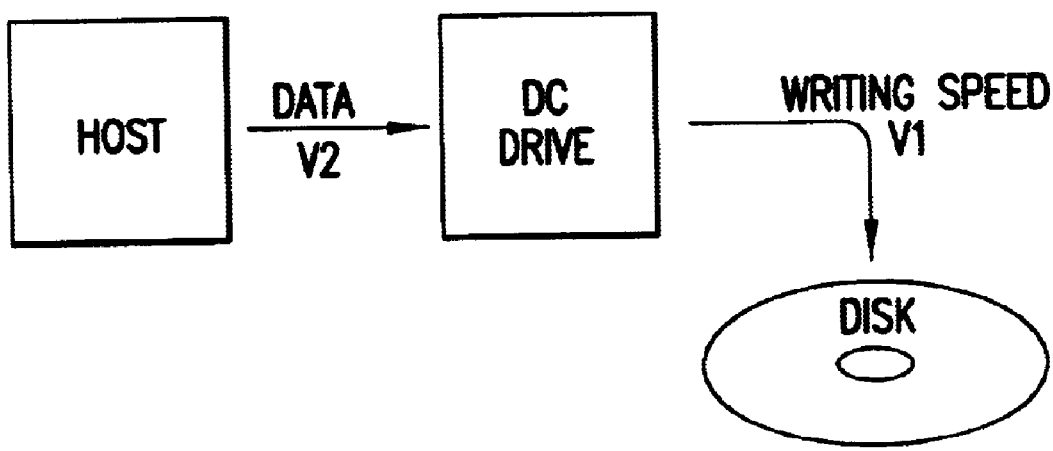
FIG. 1 is a simple schematic illustrating the writing of data from a host system to a disk that is placed inside a CD drive.
Figure 2:
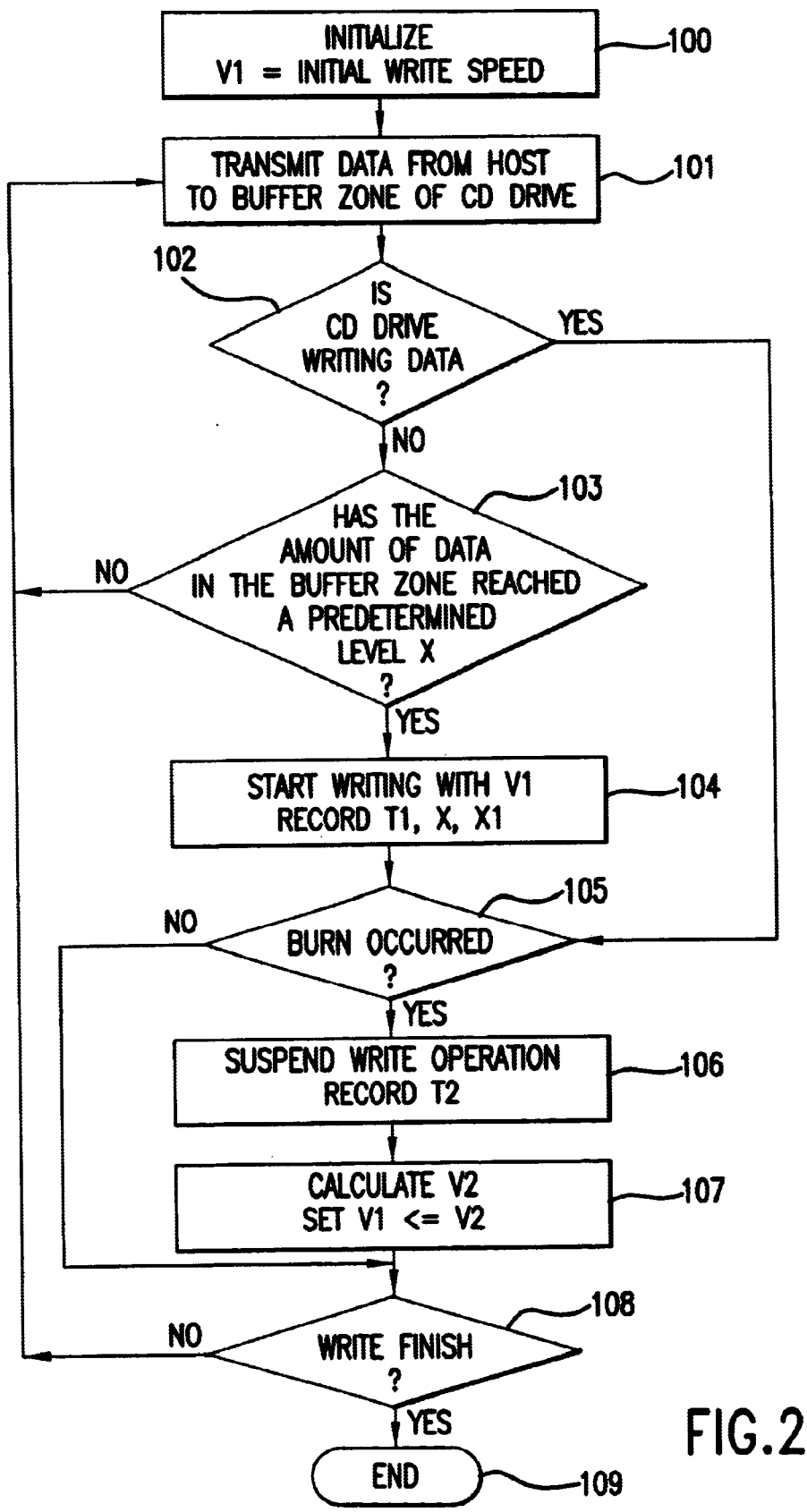
FIG. 2 is a flow chart illustrating a method according to one embodiment of the present invention.

The present invention also uses the aforementioned technologies (such as BURN Proof, Just Link, and Super Link) to re-start a writing operation. The present invention modifies the writing speed of the CD drive through firmware that is located in the CD drive. FIG. 2 is a flow chart illustrating the writing operation of the present invention, and includes the following steps:

Step 100: The CD drive is in the initial state (non-write).

Step 101: In this step, data is transmitted from the host system to the buffer zone of the CD drive. Processing then proceeds to step 102.

Step 102: In this step, it is determined whether the CD drive is writing data to a disk. If the CD drive is writing data, then processing proceeds to step 105, otherwise processing proceeds to step 103.

Step 103: In this step, it is determined whether the amount of data in the buffer zone reaches a certain critical or predetermined level X. If the amount of data in the buffer zone has reached a certain critical or predetermined level X, then processing proceeds to step 104, otherwise processing returns to step 101.

Step 104: In this step, the CD drive enters into the writing state (i.e., the CD drive begins to write data to the disk) and records the following: (i) the time T1 which is the time that the writing operation begins, (ii) amount of data X in the buffer zone at the time the writing operation begins, and (iii) the writing speed V1 of the CD drive. Processing proceeds to step 105.

Step 105: In this step, it is determined whether BURN has occurred. If BURN has occurred, then processing proceeds to step 106, otherwise processing proceeds to step 108.

Step 106: If BURN occurs (i.e., the data from the buffer zone is depleted), the CD drive enters into a suspended state and records the time T2 as the time that this BURN occurred. A technology such as BURN Proof, Just Link, and Super Link can then take over operation when the writing operation is re-started. In this regard, this technology searches for the break point of the previous (i.e., just-concluded) writing operation and will continue the writing operation from this point when the writing operation is re-started. Here, it is noted that if a previous speed adjustment had been made, and if the transmitting speed of the host does not decrease thereafter, then BURN will not occur again. Processing proceeds to step 107.

Step 107: The data transmitting speed V2 of the host system is calculated from the values of the variables T1, T2, X, and V1, using the equation: $V2=V1-[X/(T2-T1)]$. In addition, the next writing speed V1 (upon re-start) is adjusted to be less than or equal to the data transmitting speed V2 that was just calculated. In an ideal situation, V1 is adjusted to be equal to V2. Processing then proceeds to step 108.

Step 108: This step determines whether all of the data has been written onto the disk.

If no, then processing returns to step 101.

If yes, then the present writing operation is completed in step 109.

The method illustrated in FIG. 2 can be embodied as firmware in a flash ROM of the CD drive. The firmware will be responsible for carrying out the adjustment of the writing speed of the CD drive. The firmware can adjust the drive speed by setting related parameters in the drive speed controller of the CD drive. The firmware employs these parameters to carry out the writing operation at the selected speed.

Thus, by using the method of the present invention to lower the occurrence frequency of BURN, a CD drive can determine the writing speed automatically without adding additional electrical circuitry or using external forces, so that the write failure rate can be reduced so as to realize better quality and operation efficiency.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A method of minimizing the occurrence of buffer under run, comprising:

calculating the transmission speed of data from a host to a disk drive;

adjusting the writing speed of the disk drive to a disk based on the calculated transmission speed; and writing the data from the disk drive to the disk at the adjusted writing speed.

2. The method of claim 1, wherein calculating the transmission speed includes:

transmitting data from the host to the disk drive; and writing the data from the disk drive to the disk.

3. A method of minimizing the occurrence of buffer under run, comprising:

calculating the transmission speed of data from a host to a disk drive by subtracting from the existing writing speed of the disk drive the value of $[X/(T2-T1)]$, where T1 is the time the writing of data began, T2 is the time that a buffer under run occurred, and X is the amount of data that has been transmitted from the host to the disk drive prior to the time T1;

adjusting the writing speed of the disk drive to a disk based on the transmission speed; and writing the data from the disk drive to the disk at the adjusted writing speed.

4. The method of claim 2, wherein adjusting the writing speed includes:

modifying the writing speed to be less than or equal to the transmission speed.

5. The method of claim 2, suspending the writing of data when a buffer under run condition occurs.

6. A method of minimizing the occurrence of buffer under run, comprising:

transmitting data from a host to a disk drive;

writing the data from the disk drive to a disk;

calculating the transmission speed of data from the host to the disk drive;

adjusting the writing speed of the disk drive based on the calculated transmission speed; and continuing to write the data from the disk drive to the disk at the adjusted writing speed.

7. The method of claim 6, wherein calculating the transmission speed includes:

subtracting from the existing writing speed of the disk drive the value of $[X/(T2-T1)]$, where T1 is the time the writing of data began, T2 is the time that a buffer under run occurred, and X is the amount of data that has been transmitted from the host to the disk drive prior to the time T1.

8. The method of claim 6, wherein adjusting the writing speed includes:

modifying the writing speed to be less than or equal to the transmission speed.

9. A method of minimizing the occurrence of buffer under run, comprising:

transmitting data from a host to a disk drive;

writing the data from the disk drive to a disk;

suspending the writing of data when a buffer under run condition occurs;

calculating the transmission speed of data from the host to the disk drive;

continuing to transmit data from the host to the disk drive;

adjusting the writing speed of the disk drive based on the calculated transmission speed; and restarting the writing of data from the disk drive to the disk at the adjusted writing speed.

10. The method of claim 9, wherein calculating the transmission speed includes:

subtracting from the writing speed of the disk drive the value of $[X/(T2-T1)]$, where T1 is the time the writing of data began, T2 is the time that a buffer under run occurred, and X is the amount of data that has been transmitted from the host to the disk drive prior to the time T1.

11. The method of claim 9, wherein adjusting the writing speed includes:

modifying the writing speed to be less than or equal to the transmission speed.

* * * * *